United States Patent [19]

Sair et al.

[11] 3,968,268

[45] July 6, 1976

[54] PROCESS FOR PRODUCING HYDRATABLE, TRANSLUCENT TO GLASSY, PROTEINACEOUS PRODUCTS, AND THE RESULTING PRODUCTS

[75] Inventors: Louis Sair; Donald W. Quass, both of Evergreen Park, Ill.

[73] Assignee: The Griffith Laboratories, Inc., Alsip, Ill.

[22] Filed: Aug. 31, 1972

[21] Appl. No.: 285,422

Related U.S. Application Data

[63] Continuation-in-part of Ser. No. 77,720, Oct. 2, 1970, abandoned.

[52] U.S. Cl. .............................. 426/580; 426/104; 426/455; 426/506; 426/646; 426/656; 426/802

[51] Int. Cl.² ........................................... A23J 3/00

[58] Field of Search ........... 426/141, 364, 443, 455, 426/580, 104, 455, 506, 646, 656, 802

[56] References Cited

UNITED STATES PATENTS

| | | | |
|---|---|---|---|
| 3,102,031 | 8/1963 | MacAllister | 426/208 |
| 3,119,691 | 1/1964 | Ludington et al. | 426/99 |
| 3,139,342 | 6/1964 | Linskey | 426/293 |
| 3,142,571 | 7/1964 | McAnelly | 426/141 |
| 3,268,336 | 8/1966 | Hale et al. | 426/284 |

*Primary Examiner*—Raymond N. Jones
*Attorney, Agent, or Firm*—Merriam, Marshall, Shapiro & Klose

[57] ABSTRACT

Process for preparing hydratable, proteinaceous food products involving: subjecting moist (e.g., crumbly to free-flowing), hydratable, proteinaceous food material having suitable moisture to elevated mechanical pressure and suitable temperature and pH conditions to convert the protein material under non-puffing conditions to a dense, substantially homogeneous, translucent to glassy, coherent, bonded, proteinaceous product of desired size and shape. The material is thereby bonded together so as to be capable of withstanding the disruptive deterioration and loss of structural identity caused by subjecting the proteinaceous material to retorting conditions such as used in food processing. The translucent to glassy, proteinaceous product yields hydrated food products having structural integrity and desired textural characteristics.

22 Claims, No Drawings

PROCESS FOR PRODUCING HYDRATABLE, TRANSLUCENT TO GLASSY, PROTEINACEOUS PRODUCTS, AND THE RESULTING PRODUCTS

This application is a continuation-in-part of copending application Serial No. 77,720, filed Oct. 2, 1970, now abandoned, insofar as said application Serial No. 77,720 discloses the joint inventions or improvements of Louis Sair and Donald W. Quass. Application Serial No. 573,366 of Louis Sair and Donald W. Quass, filed Apr. 30, 1975, is a division of said application Serial No 77,720.

This invention relates to the preparation of edible, hydratable, proteinaceous products which are capable of withstanding retorting conditions used in food processing to yield hydrated, proteinaceous food products having structural integrity, the hydrating of said proteinaceous products, and the resulting food products.

The resulting hydrated, proteinaceous food products are suitable for use as a food or food supplement for humans.

More specifically, in the process of this invention, moist (e.g., crumbly to free-flowing), proteinaceous material (which may or may not be in an at least partly neutralized form) having a controlled amount of water is subjected to sufficient or effective elevated mechanical pressure and temperature conditions under suitable pH conditions to convert the protein material under non-puffing conditions to a dense, coherent or bonded, substantially homogeneous, translucent to glassy product having continuous structure, and in which the product, if or when hydrated with added water under retorting conditions such as used in the food processing industry, produces a coherent or bonded proteinaceous product having or retaining its structural integrity and having desired textural characteristics. The resulting translucent to glassy product forms a superior hydrated product even when hydrated by means other than retorting with added water.

Microscopic examination of the translucent to glassy product showed (see Example III hereof) that the protein cell bodies thereof had become more elongated along their elongated axes and had become organized or arranged into a more regular or uniform pattern (e.g., had a bricklike configuration).

If desired, the translucent to glassy, proteinaceous product may or may not be at least partly dried (under non-puffing conditions) before being subjected to hydration in the presence of added water.

The hydrated product has desired textural characteristics as such or, if the hydrated material is too tough, upon being suitably or coarsely ground, comminuted or otherwise subdivided to a particular form for use in coarsely ground, meat products such as meat patties, hamburger, meat loaf or the like.

When proteinaceous material is puffed from an extruder, the cells tend to be fragile. This reduces the structural integrity of such material when they are added to foods which are later cooked, hydrated or retorted. Furthermore, the puffing tends to cause the proteinaceous material to lose structure. We deliberately want to avoid puffing because our hydratable, substantially homogeneous, translucent to glassy, proteinaceous material has excellent structure. By avoiding puffing, we found that our hydratable, substantially homogeneous, translucent to glassy, proteinaceous material can be hydrated to more closely simulate the textural qualities of natural foods.

The terms "texture" and "textural", as sometimes used herein, refer to translucent to glassy proteinaceous products which when hydrated (e.g., under retorting conditions) are pleasing in the mouth and have protein cell bodies with the pleasing feel, firmness, structure, texture, coarseness or bite characteristics found in uncooked or cooked food products. It should be noted that the natural structure and texture of foods such as uncooked celery and peanuts have a pleasing texture, feel and bite in the mouth which contribute to their appetizing appeal.

As discussed later below, in determining the existence or extent of structural integrity herein, 1 part by weight of the substantially homogeneous, translucent to glassy, proteinaceous material which has been cut or formed into chunks of a selected size and shape is added with 3–4 parts by weight of water to an appropriate can. The can is sealed and the contents retorted, after which the can is opened. If the resulting hydrated product, although swollen to an increased size by contact with the water, has essentially retained its chunky shape and structure (structural identity) and has an essentially clear broth as a result of retorting, then it is deemed to have or have retained structural integrity; however, if the resulting product disintegrates to the extent that it has the consistency of porridge or is mushy and has not substantially retained its coherent, self-supporting chunky shape and structure (structural identity) and has a very milky broth formed from the disintegrated proteinaceous material and water, it is deemed not to have or not to have retained its structural integrity. The product must retain more than 50% of its shape and structure before it is herein considered as having good or excellent structural integrity.

The processing conditions (used during the formation of the dense, substantially homogeneous, translucent to glassy product) which produce proteinaceous products having good structural integrity apparently causes chemical changes in the protein molecules which result in the production of protein molecules of an increased molecular weight. This strongly suggests that chemical changes such as a cross-linking type of reaction has occurred between protein chains or molecules.

The proteinaceous material used in our process requires hydration.

The proteinaceous material may be a hydrophilic protein material such as vegetable protein material or defatted (solvent-extracted) oil seed protein material such as obtained from defatted soybean material having a protein content (dry basis) of at least about 40% or, preferably, a protein content of at least about 70% (protein concentrate). Soy protein concentrates may be used which are soluble or insoluble and have a high or low nitrogen solubility index (i.e., NSI). Furthermore, if desired, a soy protein isolate having a protein content (dry basis) of about 90% or more, or commercial casein may be used, but less advantageously than soy protein concentrates.

Proteinaceous materials from cereal grains such as wheat gluten material and rice gluten material may also be used.

Particularly good results have been obtained with soy protein concentrate and wheat gluten materials.

Excellent proteinaceous products derived from soy flour or soy flakes can be obtained having good structural integrity and desirable textural characteristics utilizing our process.

The proteinaceous material may or may not be in an at least partly neutralized form before or during conversion of the protein to the dense, substantially homogeneous, translucent to glassy form.

When one wishes to produce a bland, proteinaceous product, which for many purposes is preferred, the proteinaceous material should be substantially or essentially pure and have a high protein content. Thus, when soy protein material is used, it is desirable to use a bland, neutralized, soy protein concentrate having a protein content of at least about 70% (on a dry basis), such as produced in accordance with U.S. Pat. No. 2,881,076.

If desired, the proteinaceous material may include, for some purposes, a desired, controlled, edible amount of a suitable cereal, starch, sugar, coloring material, seasoning or flavoring ingredient, hydrolyzate, nutrients, or the like. Those materials may be present in or blended with the proteinaceous material before the resulting blend is converted to the dense, substantially homogeneous, translucent to glassy form or before or after the translucent to glassy product is subjected to hydration in the presence of added water.

The proteinaceous material is in a substantially uniform, moist (e.g., crumbly to free-flowing) state and has a controlled, effective amount of water when it is subjected to effective mechanical pressure under conditions which cause the protein material to be converted to the dense, substantially homogeneous, translucent to glassy form. The moist proteinaceous material must be subjected to treatment under conditions, including sufficient elevated mechanical pressure and satisfactory temperature and pH conditions, which result in the protein material being converted to a workable, substantially homogeneous, deformable, flowable, coherent plastic mass which forms a dense, translucent to glassy product that is not puffed as a result of that treatment. It is preferred that essentially all of the moist proteinaceous material be converted to the translucent to glassy form.

The amount of water present during the application of elevated mechanical pressure, the nature of the proteinaceous material and the material(s) blended therewith, and the conditions of temperature, pH, pressure and time used in connection with the application of pressure, and the nature of the particular type of equipment used for applying elevated pressure are interrelated and should be coordinated. Thus, when one operating condition is varied or selected, that variation or selection in turn can influence or determine the other desired or necessary operating conditions.

It has been found, for example, that if too high a temperature is reached or applied during the application of elevated pressure or the material is subjected to too high a temperature during the formation of the translucent to glassy product, some proteinaceous materials have a tendency to discolor or develop a flavor as a result thereof. The use of too low a temperataure during the application of pressure can prevent one from producing the desired translucent to glassy product.

The application of elevated mechanical pressure to the proteinaceous material tends to inrease the temperature of that material. When even below water-boiling temperatures accompany the application of mechanical pressure (e.g., compaction rolls), such conditions may yet be sufficient to form the above-referred-to plastic mass and substantially homogeneous, translucent to glassy product with certain proteinaceous materials.

However, when protein materials such as soy protein material (in the neutralized or unneutralized form) is used, it may be necessary to apply external heat to the proteinaceous material so as to subject it to water-boiling temperatures during or in conjunction with the application of elevated pressure for the purpose of forming a plastic mass which is transformed or converted into a substantially homogeneous, translucent to glassy product. In order to avoid simultaneously puffing the translucent to glassy material when the flowable mass is discharged or ejected from the system into a medium of lower pressure or unconfined zone at atmospheric pressure, it may be necessary to cool the mass or reduce its temperature to below water-boiling temperatures before the material is discharged or ejected from the system.

The controlled amount of water present in or with the proteinaceous material which is subjected to elevated pressure and requisite temperature and pH conditions must be sufficient to enable that material to convert to a plastic state which forms the substantially homogeneous, translucent to glassy product. For most purposes, it has been found that the use or presence of water in the range of approximately 12.8 to 40 parts of water per 60 parts of solids or approximately 12–13 to 40 parts of water per 60 parts of dry protein or proteinaceous material (regardless of whether or not the water is wholly or partly present as added water) is satisfactory when conventional compaction rolls or conventional extruders are used. It has been found, for example, that it is desirable to use a sufficient amount of water within the range of about 12 to 50%, preferably within the range of about 20–35%, in order to convert the proteinaceous material satisfactorily in a conventional extruder and obviate discoloring the material or forming undesired flavor conferring material.

A variety of devices may be used to apply mechanical pressure. One may use, for example, a press (e.g., Carver press), commercial rolls or pellet mill, or extruder which subjects the moist proteinaceous material to sufficient pressure and temperature conditions and forms a product of desired size and shape (e.g., sheets, discs, pellets, rods, strings or bars). When an extruder is used, it is essential not to discharge or eject the extrudate under puffing conditions, so that extrusion does not subject the material to simultaneous puffing which normally results from the rapid or sudden release of water vapor from the mass when or as the discharged or ejected extrudate enters a zone of lower pressure.

Although a variety of injection molding machines, and thermoplastic extrusion and compression molding machines may be used in the forming of the plastic mass, one can advantageously use a heatable extruder having a rotation screw (e.g., transfer screw) within a closed heatable barrel and a temperature controllable, restricted extrusion die, nozzle or orifice at the front end of the barrel. The barrel, in conjunction with the screw and die, creates, during operation, a closed chamber which prevents the release of existing water vapor from the material and system. The advancing material builds up sufficient pressure to cause the plastic mass to be pushed at the desired temperature and pressure to and through the die, nozzle or orifice. It is critical that the compressed, flowable material not be discharged or ejected from the extruder under puffing conditions for the reasons explained above. Therefore, it may be necessary to reduce the temperature of the plastic mass in the extruder by using a cooling operation or step immediately before discharging or ejecting the extrudate from the extruder. The temperature of the plastic mass may be reduced in the extruder, for example, by using an extruder having an elongated nozzle or extension which communicates with the restricted die or orifice opening and from which the extrudate is ejected or discharged in the desired configuration (e.g., as an unpuffed, rod, ribbon or string) under atmospheric conditions. The extension or the last stage of the extruder itself, for example, may be air-cooled or may include a jacket through which cooling fluid (e.g., water) may be circulated.

The moisture content of the translucent to glassy product can be reduced to the desired moisture level (e.g., preferably up to or below about 20%, or within the range of about 5–15%) by conventional means (e.g., air drying). One may partly dry the moisture-containing, translucent to glassy material, for example, with air at room temperature or hot circulating air at a temperature within the range of about 120°–200°F., preferably within the range of about 130°–150°F.

The Examples set forth below are for purposes of illustration only and my invention is not necessarily limited thereto, and in some instances, at least parts of an Example indicate or suggest process conditions or material(s) which should be avoided.

The Examples illustrate that merely using compaction pressure, either with or without heat, is not enough to produce a dense, translucent to glassy product. Furthermore, it has been found that merely producing a translucent to glassy product may not produce a product meeting the requirements of structural integrity or good structural integrity when that product is hydrated under retorting conditions such as used in the processing of canned food. The retorting of the translucent to glassy product is more disruptive to the product than merely placing the product into warm water.

In the Examples, which follow, the laboratory Brabender extruder mentioned had a 1:1 transfer screw which rotated at 100 rpm. and a barrel which was heated with circulating hot oil which was fed to a jacket which surrounded the barrel. The barrel was connected to or communicated with a die at which pressure was applied upon the material fed to it by the screw. The die had a restricted extrusion opening and was heated to selected temperatures by electrical means. The build-up of material transferred to the die by the transfer screw caused significant pressure to be applied to the material at the die. The material which was fed through the die opening (after the application of mechanically applied pressure) was fed directly into a connecting or communicating tubular die extension which was threaded into the die opening at the inner end of the extension. The extension consisted of an elongated tubular nozzle about 7 inches long. The entire length of the extension, as orignally made, had an inner diameter of ¼-inch and an outer diameter of ½-inch; however, about 6 inches of the outer discharge end of the tubular extension had been flattened so as to eject or issue extrudate in the form of a ribbon about 1/8-inch high and about ½-inch wide. The flattened extension was used in all of the runs referred to in the Examples.

The die extension was air-cooled sufficiently to avoid puffing the extrudate; however, in some instances the extension was electrically heated to facilitate plastic flow of material through the extension, but in no such instance was the temperature of the heated extension high enough to allow the extrudate to puff.

The extrusion temperatures mentioned in the Examples refer to the temperature of the die at or near the point where the material is discharged from the die into the extension and represents the highest temperature the material was treated or heated to prior to being discharged through the extension.

In determining the existence or extent of structural integrity of the extrudate in the Examples, 15 gms. of the treated proteinaceous material which had been cut into ribbon-shaped chunks (e.g., about ½ + ½ + 1/8 in. chunks) were added with 60 ml. of water to a 3-ounce can. The can was then sealed and the contents retorted at 230°F. for 90 minutes. The can was opened after being cooled. If the resulting hydrated protein product, although swollen to an increased size by contact with the heated water, had essentially retained its chunky shape and structure (structural identity) and had an essentially clear broth, then it was deemed to have or to have retained its structural integrity; however, if the resulting hydrated proteinaceous product disintegrated to the extent that it had the consistency of porridge or was mushy and had not substantially retained its coherent, self-supporting, chunky shape and structure (structural identity) and had a very milky broth, it was deemed not to have or not to have retained its structural integrity. The product must retain more than 50% of its shape and structure (excluding swelling) before it is herein considered as having good or excellent structural integrity.

The percent water absorption or hydration value expressed in the Examples is based upon the grams of water retained per gram of dry material and was determined as follows:

$$\% \text{ Water Absorption} = \frac{\text{Gms. of Water Retained}}{1 \text{ Gm. of Dry Material}} \times 100\%$$

The nitrogen solubility index (i.e., NSI) referred to in the Examples is the ratio of the weight of soluble to total nitrogen of the proteinaceous material and was calculated as follows:

$$\% \text{ NSI} = \frac{\text{Soluble Nitrogen}}{\text{Total Nitrogen}} \times 100\%$$

The NSI determination is conducted at a pH of 6.8.

EXAMPLE I

Moist soy flour which had been defatted or solvent-extracted was subjected to extrusion at various temperatures in a laboratory Brabender extruder as described above. The resulting products examined, cut into chunks about ½-inch + ½-inch + ⅛-inch, and air-dried to a moisture content of 8–13%. Fifteen grams of the material were then placed with 60 ml. of water into individual 3-ounce cans. The cans were sealed, the contents of the cans were retorted for 90 minutes at 230°F., the cans were allowed to stand overnight, and the cans were opened and the contents examined.

The soy flour used was Soy Flour I-200. Soy Flour I-200 is defatted or solvent-extracted soy flour of A. E. Staley Manufacturing Company and had a NSI of 50% and a protein content of 52%.

In the first series of runs, sufficient water (without any additive) was added to Soy Flour I-200 to produce moist soy having a moisture content of 35.4%. The pH of the moistened soy flour was 6.7.

The moistened soy flour was extruded at temperatures of 180°F., 210°F., 230°F., 260°F., 280°F., 300°F. and 320°F. The materials extruded at 180°F. and 210°F. were compacted, but were not translucent or glassy. The material extruded at 230°F. was compacted, non-homogeneous and only slightly translucent. The material extruded at 260°F. was compacted and had about 50% translucency, whereas the material extruded at 280°F. had about 90% translucency. The materials extruded at 300°F. and 320°F. had complete translucency and were completely converted to the homogeneous glassy form.

The extruded materials were then subjected to retorting (i.e., in the can) at elevated temperatures. When the materials extruded at 180°F., 210°F. and 230°F. were retorted, the retorted material which had been extruded at 180°F. disintegrated and had a consistency resembling porridge and the materials extruded at 210°F. and 230°F. formed heavy pastes and had no structural integrity. The material extruded at 260°F., when retorted, had some structural integrity and retained about 50% of its chunky shape or structure and the hydrated chunks had a water absorption value of 372%. The materials extruded at 280°F., 300°F. and 320°F., when retorted, each had excellent structural integrity and had water absorption values of 341%, 317% and 298%, respectively. More specifically, the retorted material which had been extruded at 280°F. had a clear broth; the retorted materials which had been extruded at 300°F. and 320°F. had good texture, almost resembling that of mushrooms, and had progressively clearer broths.

The second series of runs involved first adjusting the pH of the soy flour to 7.4 with sodium hydroxide equal to 0.5% of the weight of the soy flour. The material had a moisture content of 34.7%. The moist, neutralized material was then subjected to extrusion and retorting as described above.

The materials extruded at 180°F., 210°F. and 230°F. were compacted, but were not translucent to glassy and, upon being subjected to retorting, completely disintegrated and reassembled porridge. The material extruded at 260°F. showed definite conversion to the glassy form and, upon being subjected to retorting, had about 40% breakdown or loss of structural integrity and a somewhat milky broth. The material extruded at 300°F. was converted to an excellent glassy form and, upon being retorted, had excellent structural integrity, a clear broth, and a water absorption value of 375% (as compared to 317% obtained during the first series of runs).

In the third series of runs, an aqueous solution having calcium chloride and trisodium phosphaate equal to 2% and 0.5%, respectively, of the weight of soy flour used was added to the soy flour. The resulting moist flour had 34% moisture. The pH of the material was 6.3. A higher extrusion temperature was found to be necessary in order to convert the treated soy flour to the glassy form.

The material extruded at 230°F. was compacted and not translucent to glassy and, upon being retorted, completely disintegrated. The materials extruded at 260°F. and 280°F. were compacted and non-homogeneous and, upon being retorted, substantially disintegrated. About 80% of the material extruded at 300°F. was converted to the glassy form and, upon being retorted, showed some lack of structural integrity. The material extruded at 320°F. was completely converted to the glassy form and, upon being retorted, had excellent structural integrity, a clear broth, and a water absorption value of 273% (as compared to a value of 298% obtained during the first series of runs).

II

Moist soy grits which had been defatted or solvent-extracted were subjected to extrusion at various temperatures in a laborator Brabender extruder and was retorted such as described above.

The soy grits used were from Lauhoff Grain Company and had a NSI of 20% and a protein content of 52%. The soy grits were ground so that a substantial proportion passed through a 100-mesh screen.

Sufficient water (without any additive) was added to the ground soy grits to adjust their moisture content to 34.8%. The pH of the blend was 6.6.

The materials extruded at 230°F. and 260°F. were compacted, but were not translucent to glassy and, upon being subjected to retorting, disintegrated and had a consistency resembling porridge. The material extruded at 280°F. was largely in the glassy form and, upon being retorted, had substantial structural integrity and retained about ⅔ of its shape and structure. The material extruded at 300°F. showed complete conversion to the glassy form and, upon being retorted, had excellent structural integrity and a clear broth.

EXAMPLE III

Moist, soluble, soy protein concentrate was subjected to extrusion at various temperatures in a laboratory Brabender extruder and was retorted such as described above.

The soy protein concentrate used was GL-301 concentrate of The Griffith Laboratories, Inc. made in accordance with U.S. Pat. No. 2,881,076. More specifically, the concentrate is made by the aqueous isoelectric extraction of defatted soybean flour, washing the recovered filtered slurry, heating the slurry, neutralizing the slurry to a pH of about 6.5–7.3 with sodium hydroxide solution, and drying the neutralized, soy protein concentrate.

This soy protein concentrate is particularly good meat emulsifier and is used in making frankfurters, sausages and luncheon meats.

GL-301 soy protein concentrate has a NSI of about 50% and at least 70% by weight protein on a dry basis.

It was found that the glassy form of the extrudate could be formed with lower extrusion temperatures when soy protein concentrate was used than could be used effectively with the protein materials treated in accordance with Examples I and II.

In the first series of runs, sufficient water (without any additive) was added to the soy protein concentrate to produce a moist concentrate having a moisture content of 35.2%. The pH of the moistened concentrate was 6.7.

The materials extruded at 150°F. and 180°F. were compacted, but were not translucent to glassy and, upon being subjected to retorting, had a consistency resembling porridge. The material extruded at 210°F. showed some indication of conversion to the glossy form and, upon being retorted, had some structural integrity, but at least about 50% of the material had disintegrated. The material extruded at 230°F. showed about 50% conversion to the glassy form and, upon being retorted, less of the material had disintegrated than occurred with the material extruded at 210°F. The materials extruded at 260°F. and 300°F. completely converted to the glassy form and, upon being retorted, had excellent structural integrity, essentially clear broths, excellent texture and bite characteristics, and water absorption values of 290% and 310%, respectively. The material which was extruded at 300°F. and retorted had somewhat better structural integrity than the retorted material which had been extruded at 260°F.

The GL-301 concentrate materials that were extruded at 180°F., 230°F. and 300°F. were microscopically examined and compared. The glassy material that had been extruded at 300°F. was distinguishable over the other two materials in that it had cells that were much more elongated and became organized or arranged into a regular or uniform, aligned (aligned along elongated axes) cellular pattern. The material that was extruded at 300°F. was subjected to an amino acid assay, and that assay showed a decrease in the percent of some of the amino acid groups of the protein; this apparently evidences that a cross-linking type of chemical reaction probably occurred involving amino acid groups of the molecules.

In the second series of runs, an aqueous solution having calcium chloride and trisodium phosphate equal to 2% and 0.5%, respectively, of the weight of the soy protein concentrate was added to the soy protein concentrate. The resulting moist, soy protein concentrate had 34.6% moisture and a pH of 6.3. A higher extrusion temperature was found to be necessary in order to convert the soy protein concentrate to the desired glassy form.

The materials extruded at 180°F., 210°F. and 230°F. were compacted, but were essentially non-glassy and, upon being retorted, exhibited a large breakdown of structural integrity. The material extruded at 260°F. was partly converted to the glassy form and, upon being retorted, showed definite signs of some breakdown of structural integrity. The material extruded at 300°F. converted to an excellent glassy form and, upon being retorted, had excellent structural integrity, a very clear broth and a water absorption value of 187%.

Suitable additives thus contribute to the toughness of the texture and a reduction of the water absorption value.

EXAMPLE IV

Moist, substantially water-insoluble, soy protein concentrate was subjected to extrusion at various temperatures in a laboratory Brabender extruder and was retorted such as described above.

The soy protein concentrate was Patti-Pro No. 600 concentrate of The Griffith Laboratories, Inc. That concentrate was made by treating toasted, defatted soybean grits at a pH of about 4.2–4.5. The slurry was dewatered and the recovered insoluble, soy protein slurry was diluted with water, and centrifuged, and the recovery slurry neutralized to a pH of 6.0–6.7 with sodium hydroxide solution. The neutralized, soy protein concentrate was then dried.

This soy protein concentrate is very effectively used in coarsely ground, meat products such as meat patties and meat loaf. It has good textural and bite characteristics.

Patti-Pro No.600 protein concentrate has a NSI of approximately 10% and a protein content of at least 70% by weight on a dry basis.

Sufficient water (without any additive) was added to the soy protein concentrate to produce a moist concentrate having a moisture content of 35.3%. The pH of the material was 6.4.

The materials extruded at 210°F. and 230°F. were compacted, but were not translucent to glassy and, upon being retorted, showed a complete breakdown or loss of structural integrity. The material extruded at 260°F. was partly glassy and, upon being retorted, showed about a 50% breakdown or loss of structural integrity. The material extruded at 300°F. formed a good glassy product and, upon being retorted, had excellent structural integrity, had a clear broth, exhibited some toughness in texture and had a water absorption value of 239%.

The use of this insoluble, soy protein concentrate resulted in a loss of some water absorption or hydration qualities in the retorted materials.

EXAMPLE V

Moist, soy protein isolate was subjected to extrusion at various temperatures in a laboratory Brabender extruder and was retorted such as described above.

The soy protein insolate was Promine D of Central Soya Company, Inc. That isolate material has a NSI of 97% and a protein content of 90% by weight on a dry basis.

The materials extruded at 180°F. and up to 300°F. seemed to have a similar homogeneous appearance, but they did not have a clear glassy sheen such as exhibited by the soy flour of Example I and the soy protein concentrates of Examples III and IV which were extruded at higher temperatures.

The material extruded at 180°F. hydrated to irregular chunks after being retorted and had a water absorption value of 273%; however, there was no appreciable improvement in the amount of structural integrity after retorting the materials extruded up to 300°F.

EXAMPLE VI

Moist commercial casein was subjected to extrusion at various temperatures in a laboratory Brabender extruder and was retorted such as described above.

The casein used was a 30-mesh, commercial grade casein from New Zealand having 90% protein.

In the first series of runs, sufficient water (without any additive) was added to the casein to produce moist casein having a moisture content of 34.2%. The casein had a pH of 4.6.

The materials extruded at 110°F.–230°F. converted to the glassy form; however, the material extruded at 230°F. only differed in appearance slightly from the material extruded at 110°F. When the materials extruded at 110°F., 180°F. and 230°F. were retorted, they had definite structural integrity, clear broths, extreme toughness in texture and water absorption values ranging from 86–77%.

The second series of runs involved first adjusting the pH of the casein to 7.6 with an aqueous solution containing 2.5% sodium hydroxide based on the weight of the casein. The material had a moisture content of 22%. The moist, neutralized casein material was then subjected to extrusion and retorting such as described above.

The materials extruded at 180°F. and 230°F. readily converted to the glassy form. When those materials were retorted, they completely disintegrated and formed a viscous, jelly-like mass. Thus, the pH of the casein, as well as its conversion to the glassy form, are both important factors in forming a hydratable food product having structural integrity.

In the third series of runs, the pH of the casein was adjusted to a pH of 5.72 with an aqueous sodium hydroxide solution and had a moisture content of 21.1%.

The materials extruded at 180°F. and 230°F. readily converted to the glassy form and, upon being retorted, produced a milk-like solution, still had some structural integrity but had a quite irregular shape and structure, and had a cheese-like texture. The water absorption value of the material which had been extruded at 230°F. and retorted was 205%.

The fourth series of runs involved neutralizing the casein to a pH of 6.18 using an aqueous solution of sodium hydroxide. The moist, neutralized casein had a moisture content of 20.8%.

The materials extruded at 210°F. and 230°F. readily converted to the glassy form and, upon being retorted, completely brokedown to a viscous, soupy mass.

From the foregoing runs, it was evident that one must first form a translucent to glassy product with an extruder or other suitable equipment and the pH of the material so formed must be such that the resulting product, when retorted, has the desired water absorption or hydration properties and suitable structural integrity.

EXAMPLE VII

Moist rice gluten was subjected to extrusion at various temperatures in a laboratory Brabender extruder and was retorted such as described above.

The rice gluten used had 82% protein.

In the first series of runs, sufficient water (without any additive) was added to the rice gluten to produce a moist rice gluten having a moisture content of 34.7%. The pH of the moistened rice gluten was 4.45.

The materials extruded at 280°F. and 300°F. converted to the glassy form and, upon being retorted, had excellent structural integrity, had clear broths, were quite tough in texture, and had water absorption values of 95% and 113%, respectively.

The second series of runs involved first adjusting the pH of the rice gluten to 7.6 with an aqueous solution of sodium hydroxide. The material had a moisture content of 36.3%. The moist, neutralized material was then subjected to extrusion and retorting as described above.

The material seemed to be more readily subject to extrusion than that used in the first series of runs.

The materials extruded at 260°F., 280°F. and 300°F. converted to the glassy form. The materials extruded at 260°F. and 300°F., upon being retorted, had excellent structural integrity and somewhat better bite characteristics then were obtained during the first series of runs and had water absorption values of 127% and 126%, respectively.

In the third series of runs, the rice gluten was neutralized to a pH of 6.2 with an aqueous solution of trisodium phosphate. The resulting moist rice gluten had 26.8% moisture.

The materials extruded at 280°F. and 300°F. converted well to the glassy form and, upon being retorted, had excellent structural integrity, a somewhat dry taste, and water absorption values of 101% and 93%, respectively.

EXAMPLE VIII

Moist, devitalized wheat gluten was subjected to extrusion at various temperatures in a laboratory Brabender extruder and was retorted such as described above.

The devitalized wheat gluten used was from Japan and had 82% protein.

In this series of runs, sufficient water (without any additive) was added to the devitalized wheat gluten to produce a moist wheat gluten having a moisture content of 20.7%. The pH of the moistened wheat gluten was 5.2.

The materials extruded at 280°F. and 300°F. converted to the glassy form and, upon being retorted, had excellent structural integrity and very good fiber structure which reflected in the good textural qualities of the material, and water absorption values of 170% and 178%, respectively.

EXAMPLE IX

Moist corn gluten was subjected to extrusion at various temperatures in a laboratory Brabender extruder and was retorted such as described above.

The corn gluten used was from Corn Products Co. and had 64% protein. Corn gluten has the protein zein, which is an alcohol-soluble protein.

In the first series of runs, sufficient water (without any additive) was added to the corn gluten to produce moist corn gluten having a moisture content of 34.8%. The pH of the moistened material was 4.55.

The materials extruded at 180°F., 230°F. and 300°F. formed a "very short" extrudate and did not convert to the translucent to glassy form and, upon being retorted, showed some separation of the starch, did not have structural integrity and broke up readily upon the application of pressure in the fingers, lacked the textural characteristics required for its use as a suitable textured food product, and had a water absorption value of 115%.

The second run involved adjusting the pH of corn gluten with an aqueous solution of sodium hydroxide to produce a moist corn gluten having a moisture content of 34.9%. The pH of the moistened, neutralized material was 5.0.

The material extruded at 300°F. was compacted, but was not translucent to glassy and, upon being retorted, did not have structural integrity and had a water absorption value of 174%.

In the third run, an aqueous solution of sodium hydroxide was added to the corn gluten to raise the pH of that material to 8.2. The moist corn gluten had a moisture content of 37%.

The material extruded at 230°F. did not convert to the desired glassy form and, upon being retorted, had a water absorption value of 216%, did not have structural integrity and readily broke up in the fingers, and did not have good bite qualities.

These tests indicate that the zein protein under these conditions did not bond the particles together to withstand retorting conditions. The retorted material did not have structural integrity and the hydrated material did not have good textural characteristics.

EXAMPLE X

A moist blend of equal parts by weight of soy flour and wheat flour was subjected to extrusion at various temperatures in a laboratory Brabender extruder and was retorted such as described above.

The soy flour in the blend was Soy Flour I-200 as described in Example I and the wheat flour was unbleached, soft, clear, wheat flour.

In the first series of runs, sufficient water (without any additive) was added to the blend to produce a blend having a moisture content of 37%. The pH of the moist blend was 6.6.

The moist blend was extruded at 150°F., 180°F., 210°F. and 300°F. The materials extruded at 150°F. and 180°F. produced a discontinuous, non-glassy ribbon. The material extruded at 210°F. showed some glassy characteristics, which became more pronounced when the extrusion was conducted at 300°F.

Upon retorting these materials, the material extruded at 180°F. brokedown completely to a gum-like mass and had no structural integrity. The material extruded at 210°F., upon being retorted, showed that it had retained about ⅓ of its structural integrity, tasted somewhat like a dumpling, and had a water absorption value of 407%. The structural integrity and eating qualities remained essentially the same when the material extruded at 300°F. was retorted, and that material had a water absorption value of 375%. The softer textural characteristics of these materials apparently are related to the presence of starch and the high water absorption values.

The second and third of the series of runs involved adjusting the pH of the blend to 4.8 and 5.7 with aqueous hydrochloric acid solutions. The moisture content of the acidified blends was 34.8% and 36.5%, respectively.

The pH adjustments made in the second and third runs did not substantially change the results obtained during extrusion, or the structural integrity, eating qualities or the textural characteristics of the materials that were retorted.

In the fourth of the series of runs, an aqueous solution of calcium chloride (2% based on the weight of the protein material) and hydrochloric acid was added to the blend. The blend had a moisture content of 34.8% and a pH of 5.3. When the material was extruded at 300°F., a product having translucent to glassy characteristics was produced. When that extruded material was retorted, the material was in discrete chunks with eating characteristics similar to a dumpling.

The foregoing shows or teaches, among other things: (a) the conversion of the proteinaceous material to the dense, substantially homogeneous, translucent to glassy form described above, results in a product (e.g., highly nutritious product) having continuous structure (e.g., as shown in Example III, the cell bodies of the translucent to glassy product become more elongated and become organized or arranged into a regular or uniform pattern) which, when hydrated with added water under retorting conditions, produces a coherent or bonded proteinaceous product having or retaining its structural integrity and having desired textural characteristics; (b) merely converting moist, proteinaceous material to the dense, translucent to glassy form with pressure and at selected temperatures does not assure one that by retorting such a product an edible, hydrated product having good structural integrity will necessarily result; (c) the pH of the proteinaceous material which is converted to the dense, substantially homogeneous, translucent to glassy form can affect the hydration and textural characteristics of the retorted product; (d) the dense, substantially homogeneous, translucent to glassy, proteinaceous material may be cut or shaped to any desired size or configuration and can simulate natural food products by being formed to the size and/or shape of granules, beans, or the like; (e) the free water or broth can be decanted or removed from the hydrated, substantially homogeneous, translucent to glassy material and the hydrated material subjected to grinding, subdividing or comminuting, and added, in that reduced form, to coarsely ground meat or other food products to provide edible products having enhanced protein content and desired textural and eating characteristics (even tough, retorted or hydrated chunks of proteinaceous material can be advantageously used by being ground, comminuted or subdivided); (f) the ground, hydrated material referred to in (e), above, can be frozen, stored and later incorporated into ground meat or other food products; (g) the addition or incorporation of available calcium (e.g., calcium chloride) in or with the proteinaceous material at the time the proteinaceous material is subjected to mechanical pressure, enhances the textural characteristics of the hydrated material resulting from hydrating the dense, substantially homogeneous, translucent to glassy, proteinaceous material; (h) vitamins, minerals, coloring agents and/or flavoring agents may be incorporated into the proteinaceous material before the protein is converted to the dense, substantially homogeneous, translucent to glassy form, or, if desired, they may be added at a later stage of processing.

The forms of the invention herein shown and described are to be considered only as illustrative. It will be apparent to those skilled in the art that numerous modifications may be made without departure from the spirit of the invention or the scope of the appended claims.

We claim:

1. The method of preparing an unpuffed, proteinaceous food product comprising subjecting water-moistened, edible proteinaceous material having at least about 40% by weight protein on a dry weight basis and an effective amount of water within the range of about 10 to 50% to working under effective mechanical pressure with added heat sufficient to convert it to a hot, moist, plastic extrudable mass and extruding said hot plastic mass through and from a length of a temperature controlled, elongated die under non-puffing conditions to provide an unpuffed, substantially homogeneous, translucent to glassy, extruded product characterized by having texture and retaining its structural integrity under retorting conditions.

2. The method of claim 1 wherein said proteinaceous material comprises a member of the group consisting of soy protein material, wheat gluten, casein, rice gluten, and admixtures thereof.

3. The method of claim 1 wherein said proteinaceous material comprises soy protein material.

4. The method of claim 1 wherein said proteinaceous material comprises wheat gluten.

5. The method of preparing an unpuffed, proteinaceous food product comprising subjecting water-moistened, edible proteinaceous material having at least about 40% by weight protein on a dry weight basis and an effective amount of water within the range of about 10 to 50% to working under effective mechanical pressure with added heat sufficient to convert it to a hot, moist, plastic extrudable mass and extruding said hot plastic mass through and from a length of a temperature controlled, elongated die under non-puffing conditions to provide an unpuffed, substantially homogeneous, translucent to glassy, extruded product characterized by having texture and retaining its structural integrity under retorting conditions, and said added heat includes the application of temperature conditions sufficiently high that the elongated die effects cooling of the advancing hot plastic mass before it leaves said die, thereby maintaining non-puffing conditions.

6. The method of claim 5 wherein said proteinaceous material comprises a member of the group consisting of soy protein material, wheat gluten, casein, rice gluten, and admixtures thereof.

7. The method of claim 5 wherein said proteinaceous material comprises soy protein material.

8. The method of claim 5 wherein said proteinaceous material comprises wheat gluten.

9. An edible, unpuffed, proteinaceous extrudate product having at least about 40% by weight protein on a dry weight basis prepared from extruding water-moistened, proteinaceous material in the form of a hot, moist, plastic extrudable mass through and from a length of a temperature controlled, elongated die under non-puffing conditions to provide an unpuffed, substantially homogeneous, translucent to glassy, extruded product characterized by having texture and retaining its structural integrity under retorting conditions, said extrudate product being produced by the method of claim 1.

10. An edible, unpuffed, proteinaceous extrudate product having at least about 40% by weight protein on a dry weight basis prepared from extruding water-moistened, proteinaceous material in the form of a hot, moist, plastic extrudable mass through and from a length of a temperature controlled, elongated die under non-puffing conditions to provide an unpuffed, substantially homogeneous, translucent to glassy, extruded product characterized by having texture and retaining its structural integrity under retorting conditions, said proteinaceous material comprising a member of the group consisting of soy protein material, wheat gluten, casein, rice gluten, and admixtures thereof, and said extrudate product being produced by the method of claim 1.

11. An edible, unpuffed, proteinaceous extrudate product having at least about 40% by weight protein on a dry weight basis prepared from extruding water-moistened, soy protein material in the form of a hot, moist, plastic extrudable mass through and from a length of a temperature controlled, elongated die under non-puffing conditions to provide an unpuffed, substantially homogeneous, translucent to glassy, extruded product characterized by having texture and retaining its structural integrity under retorting conditions, said extrudate product being produced by the method of claim 1.

12. An edible, unpuffed, proteinaceous extrudate product having at least about 40% by weight protein on a dry weight basis prepared from extruding water-moistened, wheat gluten material in the form of a hot, moist, plastic extrudable mass through and from a length of a temperature controlled, elongated die under non-puffing conditions to provide an unpuffed, substantially homogeneous, translucent to glassy, extruded product characterized by having texture and retaining its structural integrity under retorting conditions, said extrudate product being produced by the method of claim 1.

13. A subdivided, edible, unpuffed, proteinaceous extrudate product having at least about 40% by weight protein on a dry weight basis prepared from extruding water-moistened, proteinaceous material in the form of a hot, moist, plastic extrudable mass through and from a length of a temperature controlled, elongated die under non-puffing conditions to provide an unpuffed, substantially homogeneous, translucent to glassy, extruded product characterized by having texture and retaining its structural integrity under retorting conditions, and subdividing the extruded product, said extrudate product being produced by the method of claim 5.

14. A subdivided, edible, unpuffed, proteinaceous extrudate product having at least about 40% by weight protein on a dry weight basis prepared from extruding water-moistened, proteinaceous material in the form of a hot, moist, plastic extrudable mass through and from a length of a temperature controlled, elongated die under non-puffing conditions to provide an unpuffed, substantially homogeneous, translucent to glassy, extruded product characterized by having texture and retaining its structural integrity under retorting conditions, and subdividing the extruded product, said proteinaceous material comprising a member of the group consisting of soy protein material, wheat gluten, casein, rice gluten, and admixtures thereof, and said extrudate product being produced by the method of claim 5.

15. A subdivided, edible, unpuffed, proteinaceous extrudate product having at least about 40% by weight protein on a dry weight basis prepared from extruding water-moistened, soy protein material in the form of a hot, moist, plastic extrudable mass through and from a length of a temperature controlled, elongated die under non-puffing conditions to provide an unpuffed, substantially homogeneous, translucent to glassy, extruded product characterized by having texture and retaining its structural integrity under retorting conditions, and subdividing the extruded product, said extrudate product being produced by the method of claim 5.

16. A subdivided, edible, unpuffed, proteinaceous extrudate product having at least about 40% by weight protein on a dry weight basis prepared from extruding water-moistened, wheat gluten material in the form of a hot, moist, plastic extrudable mass through and from a length of a temperature controlled, elongated die under non-puffing conditions to provide an unpuffed, substantially homogeneous, translucent to glassy, extruded product characterized by having texture and retaining its structural integrity under retorting conditions, and subdividing the extruded product, said extrudate product being produced by the method of claim 5.

17. A food composition comprising (a) an edible, unpuffed, proteinaceous extrudate product having at least about 40% by weight protein on a dry weight basis prepared from extruding water-moistened, proteinaceous material having an effective amount of water within the range of about 10 to 50% in the form of a hot, moist, plastic extrudable mass through and from a length of a temperature controlled, elongated die under non-puffing conditions to provide an unpuffed, substantially homogeneous, translucent to glassy, extruded product characterized by having texture and retaining its structural integrity under retorting conditions, said extrudate product being produced by the method of claim 1 and (b) at least one other food product that is compatible with said extrudate of (a).

18. The composition of claim 17 wherein said component (b) comprises at least one other nutrient.

19. The composition of claim 17 wherein said component (a) is hydrated and in a subdivided form, and said component (b) comprises ground meat.

20. A food composition comprising (a) an edible, unpuffed, proteinaceous extrudate product having at least about 40% by weight protein on a dry weight basis prepared from extruding water-moistened, proteinaceous material having an effective amount of water in the range of 10 to 50% in the form of a hot, moist, plastic extrudable mass through and from a length of a temperature controlled, elongated die under non-puffing conditions to provide an unpuffed, substantially homogeneous, translucent to glassy, extruded product characterized by having texture and retaining its structural integrity under retorting conditions, said proteinaceous material having at least 40% by weight protein on a dry weight basis and comprising a member of the group consisting of soy protein material, wheat gluten, casein, rice gluten, and admixtures thereof, said extrudate product being produced by the method of claim 1 and (b) at least one other food product that is compatible with said extrudate of (a).

21. The composition of claim 20 wherein said component (b) comprises at least one other nutrient.

22. The composition of claim 20 wherein said component (a) is hydrated and in a subdivided form, and said component (b) comprises ground meat.

* * * * *